US012671500B2

(12) United States Patent
Buscaino et al.

(10) Patent No.: US 12,671,500 B2
(45) Date of Patent: Jun. 30, 2026

(54) WAVELENGTH DIVERSITY TURBULENCE MITIGATION METHOD AND APPARATUS FOR FREE-SPACE OPTICAL COMMUNICATIONS

(71) Applicant: CIENA CORPORATION, Hanover, MD (US)

(72) Inventors: Brandon Taylor Buscaino, Mountain View, CA (US); Mohammad Ebrahim Mousa Pasandi, Ottawa (CA); Shahab Oveis Gharan, Ottawa (CA); Michael Reimer, Sittsville (CA)

(73) Assignee: CIENA CORPORATION, Hanover, MD (US)

( * ) Notice: Subject to any disclaimer, the term of this patent is extended or adjusted under 35 U.S.C. 154(b) by 307 days.

(21) Appl. No.: 18/541,189

(22) Filed: Dec. 15, 2023

(65) Prior Publication Data

US 2025/0202586 A1 Jun. 19, 2025

(51) Int. Cl.
*H04B 10/11* (2013.01)
*H04B 10/294* (2013.01)
(Continued)

(52) U.S. Cl.
CPC ........... *H04B 10/294* (2013.01); *H04B 10/58* (2013.01); *H04B 10/61* (2013.01); *H04B 10/07* (2013.01);
(Continued)

(58) Field of Classification Search
CPC ...... H04B 10/294; H04B 10/58; H04B 10/61; H04B 10/112; H04B 10/118; H04B 10/07;
(Continued)

(56) References Cited

U.S. PATENT DOCUMENTS 6,181,450 B1 * 1/2001 Dishman .............. H04B 10/118
398/79
6,731,878 B1 * 5/2004 Britz ................... H04J 14/0305
398/118
(Continued)

FOREIGN PATENT DOCUMENTS

WO 0106663 A2 1/2001

OTHER PUBLICATIONS

Sun et al, Adaptive digital combining for coherent free space optical communications with spatial diversity, Mar. 2019, Optics Communications, All Document. (Year: 2019).*
(Continued)

*Primary Examiner* — Dibson J Sanchez
(74) *Attorney, Agent, or Firm* — Guntin & Gust, PLC; Kenneth S. Kwan

(57) ABSTRACT

Aspects of the subject disclosure may include, for example, receiving a plurality of modulated optical wavelengths generated from digital input data and unmodulated optical wavelengths. The one or more of the plurality of modulated optical wavelengths undergo an optical operation and are converted into one or more electrical signals. The optical operation increases a signal to noise ratio (SNR) of the one or more electrical signals to exceed an SNR threshold. Additionally, the one or more electrical signals are processed to produce digital output data. Other embodiments are disclosed.

20 Claims, 11 Drawing Sheets

(51) Int. Cl.
| | |
|---|---|
| *H04B 10/58* | (2013.01) |
| *H04B 10/61* | (2013.01) |
| *H04B 10/07* | (2013.01) |
| *H04B 10/079* | (2013.01) |
| *H04J 14/00* | (2006.01) |
| *H04J 14/02* | (2006.01) |

(52) U.S. Cl.
CPC ........ *H04B 10/07953* (2013.01); *H04B 10/11* (2013.01); *H04J 14/00* (2013.01); *H04J 14/02* (2013.01); *H04J 14/0298* (2013.01)

(58) Field of Classification Search
CPC ... H04B 10/07953; H04B 10/11; H04J 14/02; H04J 14/00; H04J 14/0298
USPC ......... 398/9–38, 43–103, 118–131, 202–214
See application file for complete search history.

(56) References Cited

U.S. PATENT DOCUMENTS

| | | | | |
|---|---|---|---|---|
| 7,106,971 | B1 * | 9/2006 | Davis ................... | H04B 10/112 398/121 |
| 10,938,483 | B1 * | 3/2021 | Babaee .............. | H04B 10/6971 |
| 2005/0249501 | A1 * | 11/2005 | Wolcott ............. | H04B 7/18508 398/118 |
| 2012/0257898 | A1 * | 10/2012 | Yokoi ................. | H04L 27/2697 398/76 |
| 2013/0266314 | A1 * | 10/2013 | Lee .................... | H04B 10/2507 398/43 |
| 2015/0318925 | A1 * | 11/2015 | Tsonev ................ | H04L 27/2626 398/79 |
| 2017/0054527 | A1 * | 2/2017 | Birnbaum ................. | H04L 1/02 |
| 2017/0201321 | A1 * | 7/2017 | Uysal ................... | H04B 10/116 |
| 2020/0044737 | A1 * | 2/2020 | Arikawa .............. | H04B 17/336 |
| 2020/0162159 | A1 * | 5/2020 | Wei ...................... | H04B 10/116 |
| 2021/0175975 | A1 * | 6/2021 | Nykolak ............. | H04B 10/118 |
| 2023/0012584 | A1 * | 1/2023 | Matsuda ................. | H04J 14/02 |
| 2024/0129044 | A1 * | 4/2024 | Almonacil ............. | H04B 10/11 |

OTHER PUBLICATIONS

Okikiade et al, Performance Analysis of FSO Communication Systems with Higher-Order Spatial Diversity Schemes, Jun. 2017, Journal of Communications, All Document. (Year: 2017).*

Abadi, Mojtaba Mansour, et al., "FSO Detection Using Differential Signaling in Outdoor Correlated-Channels Condition", IEEE Photonics Technology Letters, vol. 28, No. 1, Jan. 1, 2016, 4 pages.

Al-Habash, M. A., et al., "Mathematical model for the irradiance probability density function of a laser beam propagating through turbulent media", 2001 Society of Photo-Optical Instrumentation Engineers; Opt. Eng. 40(8), Aug. 2001, 9 pages.

Andrews, Larry C., et al., "Laser Beam Propagation through Random Media, Second Edition", SPIE—The International Society for Optical Engineering, 2005, 808 pages.

Belmonte, Aniceto , et al., "Capacity of coherent free-space optical links using diversity-combining techniques", Optical Society of America, Jul. 10, 2009, 11 pages.

Belmonte, Aniceto , et al., "Sequential Optimization of Adaptive Arrays in Coherent Laser Communications", Journal of Lightwave Technology, vol. 31, No. 9, May 1, 2013, 5 pages.

Billault, Vincent , et al., "Free space optical communication receiver based on a spatial demultiplexer and a photonic integrated coherent combining circuit", Optics Express; vol. 29, No. 21, Oct. 11, 2021, 10 pages.

Choutagunta, Karthik , et al., "Adapting Mach—Zehnder Mesh Equalizers in Direct-Detection Mode-Division-Multiplexed Links", Journal of Lightwave Technology, vol. 38, No. 4, Feb. 15, 2020, 13 pages.

Djordjevic, Ivan B., et al., "Adaptive Modulation and Coding for Free-Space Optical Channels", J. Opt. Commun. Netw., vol. 2, No. 5, May 2010, 9 pages.

Freier, Christian , et al., "Scalable all-fiber coherent beam combination using digital control", Applied Optics, vol. 61, No. 15, May 20, 2022, 6 pages.

Fried, David L., "Optical Heterodyne Detection of an Atmospherically Distorted Signal Wave Front", Proceedings of the IEEE, vol. 55, No. 1, Jan. 1967, 11 pages.

Geisler, David J., et al., "Multi-aperture digital coherent combining for free-space optical communication receivers", Optics Express 12661; Optical Communications Technology, Massachusetts Institute of Technology Lincoln Laboratory, Jun. 1, 2016, 11 pages.

Hernandez, Daniel Malacara, et al., "Near-Earth Laser Communications", Optical Science and Engineering, 2021, 466 pages.

Kolmogorov, A.N. , "The local structure of turbulence in incompressible viscous fluid for very large Reynolds numbers", Downloaded Jan. 24, 2023, 5 pages.

Larsson, Rasmus , et al., "Coherent combining of low-power optical signals based on optically amplified error feedback", Optics Express, vol. 30, No. 11, May 23, 2022, 15 pages.

Milanizadeh, Maziyar , et al., "Establishing Multiple Chip-to-Chip Orthogonal Free-Space Optical Channels using Programmable Silicon Photonics Meshes", 2022 IEEE Photonics Society Summer Tropicals Meeting Series, 2022, 2 pages.

Morichetti , et al., "Mitigation of Atmospheric Turbulence in an Optical Free Space Link with an Integrated Photonic Processor", OFC 2023 © Optica Publishing Group 2023, Mar. 5, 2023, 3 pgs.

Navidpour, S. Mohammad, et al., "BER Performance of Free-Space Optical Transmission with Spatial Diversity", IEEE Transactions on Wireless Communications, vol. 6, No. 8, Aug. 2007, 7 pages.

Niu, Mingbo , et al., "MIMO Architecture for Coherent Optical Wireless Communication: System Design and Performance", J. Opt. Commun. Netw., vol. 5, No. 5, May 2013, 10 pages.

Popoola, W.O. , et al., "Error performance of terrestrial free space optical links with subcarrier time diversity", IET Communications; In Special Section: Photonic and Free Space Optics Networks, Revised Jul. 8, 2011, 8 pages.

Purvinskis, Robert , et al., "Multiple-wavelength free-space laser communications", Proceedings of Spie; Event: High-Power Lasers and Applications, San Jose, CA, United States, 2003, 9 pages.

Rao, Chenjie , et al., "Toward Practical Digital Phase Alignment for Coherent Beam Combining in Multi-Aperture Free Space Coherent Optical Receivers", IEEE Access, Nov. 4, 2020, 11 pages.

Thi, Mat Nguyen, et al., "Seven-Aperture Direct-Detection Receiver for Free-Space Optical Communication Systems", OFC 2022; Optica Publishing Group 2022, Downloaded Oct. 12, 2022, 3 pages.

Tsiftsis, Theodoros A., et al., "Optical Wireless Links with Spatial Diversity over Strong Atmospheric Turbulence Channels", IEEE Transactions on Wireless Communications, vol. 8, No. 2, Feb. 2009, 7 pages.

Tyson, Robert K., "Principles of Adaptive Optics, Third Edition", 2011, 318 pages.

Weerackody, V. , et al., "Wavelength Correlation in Free Space Optical Communication Systems", IEEE Xplore, Downloaded Nov. 29, 2022, 6 pages.

Yang, Yan , et al., "Multi-aperture all-fiber active coherent beam combining for free-space optical communication receivers", Optics Express 27519; vol. 25, No. 22, Oct. 20, 2017, 14 pages.

Young, C. Y., et al., "Two-frequency mutual coherence function of a Gaussian beam pulse in weak optical turbulence: an analytic solution", Applied Optics, vol. 35, No. 33, Nov. 20, 1996, 5 pages.

Zheng, Donghao , et al., "Performance enhancement of free-space optical communications under atmospheric turbulence using modes diversity coherent receipt", Optics Express 28879, vol. 26, No. 22, Oct. 24, 2018, 12 pages.

"International Search Report and Written Opinion mailed Mar. 12, 2025 for PCT Application Serial No. PCT/US2024/059473".

Perlot, et al., "Bidirectional 20-Gbit/s OOK Link with a 4-Telescope Array and Incoherent Signal Combining", 2019 IEEE International Conference on Space Optical Systems and Applications (ICSOS), IEEE, Oct. 14, 2019 (Oct. 14, 2019), pp. 1-4, XP033702249, DOI: 10.1109/ICSOS45490.2019.8978966 [retrieved on Jan. 31, 2020] p. 1, figure 1, 4 Pages.

Srivastava, et al., "Performance Analysis of Negative Exponential Turbulent FSO Links with Wavelength Diversity", 2020 12th Inter-

(56) References Cited

OTHER PUBLICATIONS national Symposium on Communication Systems, Networks and Digital Signal Processing (CSNDSP), IEEE, Jul. 20, 2020 (Jul. 20, 2020), pp. 1-5, XP033855811, DOI: 10.1109/CSNDSP490492020. 9249618 [retrieved on Nov. 4, 2020] abstract figure 1 Section II.A, 5 Pages.

"24828299.8 EPO Office Action Mailed Oct. 30, 2025", Oct. 30, 2025, 10 pgs.

\* cited by examiner

300

WAVELENGTH DIVERSITY TURBULENCE MITIGATION METHOD AND APPARATUS FOR FREE-SPACE OPTICAL COMMUNICATIONS

FIELD OF THE DISCLOSURE

The subject disclosure relates to a wavelength diversity turbulence mitigation method and apparatus for free-space optical communications.

BACKGROUND

Free-Space Optical Communications
Application Spaces
Satellite Constellations

In the past decade, there has been a significant rise in the total number of satellites being launched into low-earth orbit (LEO) with the purpose of serving as nodes in a globe-spanning communications network. Leading companies are SpaceX™, Amazon™, and Telesat™. These satellites have initially been provisioned with RF links, but in late 2022, have had their optical backbone links turned on.

The optical challenges associated with space-to-space links are somewhat less severe than optical links that traverse atmosphere due to the lack of atmospheric scintillation. It appears that satellite constellation operators are focused on bringing coherent pluggables into space to counteract high beam spread loss, boost data rate, and leverage a maturing market. It appears 100 Gb/s optical links is the primary focus for near-future deployment.

There are other purely space-based applications, specifically NASA's Laser Communications Relay Demonstration (LCRD) is intended to scope out a possible laser relay system from geosynchronous satellites to the moon and beyond (spacecraft launched further into the solar system).

Aerial Terminals

Recently, several companies such as Alphabet (Sonora, Loon), Meta (Aquila), and Lockheed Martin, have explored the use of optical links employed on high-altitude vehicles (HAVs) above the worst atmospheric turbulence. In some cases, the intended purpose is to mimic LEO satellite constellations to provide internet services to ground customers, with more flexible provisioning. Other applications are motivated by increasing the bandwidth of aircraft passenger internet access, whereby an aircraft would use an optical link to connect to a LEO satellite, instead of directly to the ground. Some of these efforts have been postponed or outright cancelled.

While aerial-to-aerial links can avoid most of the challenges associated with optical turbulence, new practical problems are introduced, such as aircraft vibration effects on pointing and tracking, network provisioning of limited flight-time aircraft, and the need for ground-based connectivity. Aerial-to-ground optical links must traverse the atmosphere at some point, introducing an additional bandwidth bottleneck to be discussed in the "Hybrid Optical Links" section below.

Terrestrial Terminals

Ground-based optical links are frequently discussed in the context of backhaul applications for last-mile customers or for difficult terrain where laying fiber is impractical. Shorter optical links may also be used for areas with high RF activity or latency/security-constrained environments. Typically, terrestrial links are between 500 m and 5 km, depending on the environment and operate in the near-infrared. Since atmospheric turbulence is highest near the ground, turbulence mitigation techniques are typically employed, increasing the cost of these systems and positioning them as a niche market. Commercial products have been available for several decades and have recently scaled to 10 Gb/s links.

Marine Terminals

Diversity techniques can be used to compensate for turbulent environments above large bodies of water such as oceans or lakes. The turbulent flow and humidity in the air present a challenging environment for free-space optical communications. Some applications are secure ship-to-ship, ship-to-shore, or shore-to-shore communications.

Hybrid Optical Links

Recently, there has been renewed interest in optical links that traverse multiple of these domains, such as ground-to-air links supporting HAV constellations or ground-to-LEO optical links supporting LEO satellite constellations. In particular, LEO-to-ground optical links may become more prominent in the coming years to address the increase in space-based cross-sectional bandwidth of the constellations. Current traffic-routing solutions utilize RF downlinks from LEO satellites, which are limited by size, weight, and power (SWaP) constraints to around 500 Mb/s.

There are also additional applications that require hybrid optical links besides constellations. Currently, LEO and GEO satellites generate significant amounts of data that must be transmitted to the ground. NASA's Terabyte Infrared Delivery (TBIRD) program is intended to address this bottleneck. However, recent experimental demonstrations have had limited success at transferring data at speeds faster than 5-10 Gb/s aggregate bit rates.

Challenges of Free-Space Optical Communications
Pointing, Acquisition, and Tracking (PAT)

Pointing and tracking between optical terminals has been and continues to be a challenge for modern Free-Space Optical (FSO) systems. Complex control algorithms are required to ensure that the optical beam profile from the transmitter is translated to a receiver beam profile that overlaps with the receiver aperture. While problems plague practical systems, there are well-known and studied techniques for all ranges of free-space optical links.

Severe Weather

Weather such as rain, clouds, or fog, can have deleterious effects on a free-space optical link. Frequently, severe weather causes optical links to go down regardless of the amount of optical power available at the transmitter. In these cases, a slower RF backup link is often required. In some cases, networks can be designed to route signals through multiple other paths if one optical link is unavailable, but to ensure a fixed reliability rate, redundant transmitter and receiver terminals are required. This technique is an example of spatial diversity that will be discussed in the "Turbulence Mitigation Techniques" section below.

Clear-Air Turbulence

Clear-air turbulence is among a class of atmospheric conditions where attenuation of and optical signal is relatively low, compared to vacuum, but atmospheric effects due to air movement, temperature, and pressure, distorts the optical signals in various ways that make reception of the signal difficult. Frequently, clear-air turbulence results in fading, whereby the received intensity of an optical signal decreases rapidly below the receiver sensitivity due to multi-path interference effects in the atmosphere. The observed statistical nature of the received optical intensity through the atmosphere is the basis for many theoretical models.

The most prominent theory of atmospheric turbulence is Kolmogorov's Theory of Turbulence, where the atmosphere is treated as a viscous liquid undergoing turbulent flow. Furthermore, the atmosphere is assumed to be composed of eddies of varying sizes, and in thermal equilibrium there is a distribution of eddies sizes, which, given various other parameters such as wind speed and pressure, determine the total effects of refraction and interference of an optical signal as it traverses the atmosphere. Specifically, the index of refraction structure function, which describes the correlation of the refractive index in the receiver plane, is $$\Phi_n(K) = 0.033 C_n^2 K^{-11/3},$$

where K is the spatial frequency and $$C_n^2$$

is the refractive index structure constant which describes the overall strength of the turbulence. This theory has led to the theoretical and experimental exploration of the effects of atmosphere on optical transmission, including the optical phase. Additional models have been built up on this theory, such as the Gamma-Gamma model, which will be used later, where atmospheric turbulence is characterized primarily by the size of the smallest and largest atmospheric eddies. These length scales, derived from $$C_n^2,$$

are then used to predict the distribution of the intensities at the receiver plane.

Finally, in the context of free-space optical heterodyne receivers, statistical information about the phase of the received optical signal can be ascertained. Specifically, the coherence length is defined roughly as the length in the receiver plane between points where the phase of the optical signal is well-correlated, which is critical for coherent optical communications systems. The coherence length is related to the link length, wavelength, and turbulence strength:

$$r_0 = 1.68 \left( C_n^2 L k^2 \right)^{-3/5},$$

valid for a plane wave.

Turbulence Mitigation Techniques

Optical Techniques

Fade Threshold

One technique to avoid intensity fading of an optical signal is to send additional optical power from the transmitter aperture. The ratio of average received optical power to the receiver sensitivity is called the fade threshold. Increasing the fade threshold decreases the probability of a fading event dropping the received signal intensity below the receiver sensitivity, resulting in a link outage. The obvious drawbacks to this method are a decrease in efficiency, decrease in signal to noise ratio (SNR) and potential limitations due to eye-safety concerns. Importantly, some optical links under conditions of high turbulence can experience very deep fades, on the order of tens of dBs, much higher than practical fad thresholds.

Aperture Averaging

Another technique by which atmospheric turbulence can be mitigated is aperture averaging. By increasing the aperture size, additional light is collected and combined in the receiver waveguide. For coherent communications, increasing the aperture size within the coherence length increases the SNR, while aperture averaging is limited past the coherence length.

Adaptive Optics

One compensatory optical technique is adaptive optics, whereby the received optical wavefront is measured and compensated so that the discretized wavefront is coherently summed in the receiving waveguide. By sensing the wavefront, such as with a Shack-Hartmann wavefront sensor, the relative phases of the pixelized wavefront can be estimated and corrected. Necessarily, the use of adaptive optics requires constant temporal updates to the wavefront correcting element as the atmosphere changes.

Networking Techniques

Repetition Coding and ARQ

For many FSO systems, the primary impairment is temporal fading. Depending on the length of the link and the strength of the turbulence, mean fading times can occur on the time scales of tens of microseconds to 10s of milliseconds. Some systems implement automatic repeat requests (ARQ) so that if packets are dropped in the FSO link, they may be transmitted. Similarly, some links shift the complexity to signal coding and introduce temporal redundancy with various type of repetition coding. In the latter case, the statistical nature of fading is used to reduce the likelihood of an outage, while in the former, fading is dealt with by a higher protocol. Both methods significantly increase the latency of the FSO link.

Adaptive Coding

Some FSO systems utilize adaptive coding to adapt to the unpredictable FSO channel. Frequently in these implementations, an RF back-channel is used to convey information about the FSO channel, which is used to reduce or increase the modulation format order. This requires synchronization at both transmitter and receiver ends as well as a reliable estimator for the channel. In addition, this method is not necessarily compatible with fixed rate networks where optical links are expected to be able to support a specific maximum data rate at any given time.

Diversity-Based Techniques

A method of decreasing the outage probability of an FSO link is by utilizing transmitter or receiver diversity. In its simplest form, identical or similar information is sent across multiple independent of sufficiently uncorrelated channels to increase the probability that the information is successfully transmitted and received.

Time Diversity

A form of diversity is temporal diversity to decrease the outage probability. While repetition coding is an example of time-diversity, any uncorrelated channels can be used to re-transmit information. For example, a sometimes-used method is subcarrier intensity modulation (SIM) whereby different subcarriers of an intensity-modulated signal are used to transmit independent data streams. In one implementation, the same information, but time-delayed, is transmitted on each subcarrier.

Spatial Diversity

Spatial diversity techniques often leverage the spatial decorrelation of the atmosphere to reduce the likelihood of an outage and increase the BER. Various implementations use one or multiple transmit apertures focused onto one or multiple receiver apertures in either the near-field or far-field. Without loss of generality, we consider receiver diversity schemes, though the methods can also be used for a combination of receiver and transmitter diversity schemes.

If multiple copies of the transmitted optical signal are received, then the information can be gathered and processed to determine the original signal. Some common methods are: maximal ratio combining (MRC), equal gain combining (EGC), or selective combining (SC). Transmitter and receiver methods may use multiple separate apertures or utilize a single aperture that can transmit or receive multiple spatial modes, such as coupling into few-mode fiber. These methods can be used with both coherent optical links as well as optical links based on direct detection. The methods are described briefly below:

MRC: The received signals are combined optimally to maximize the desired metric, often SNR. If there are amplifying elements in the receiver combining architecture, the noise from those sources, as well as other noise sources, are estimated and used for the MRC algorithm.

EGC: Each of the received signals is amplified to a similar value and either coherently or incoherent combined, depending on the detection method. Generally, EGC underperforms MRC.

SC: The received signal with either the highest power or highest SNR is selected from all of the receivers and all other receiver outputs are ignored. Easiest to implement but lower performance.

Coherent and Noncoherent Combining

The above methods can be done in either the optical domain or the electrical domain. If the signals are combined in the optical domain, they are typically combined with interferometric devices, either concatenated Mach-Zehnder (MZ) modulators, or meshes of MZ modulators, whose relative path length differences are adjusted to align the phase of one or more received optical signals. In recent years there have been several theoretical and experimental studies of optical phase alignment algorithms for spatial diversity receivers.

Similarly, phase alignment can also occur in the electrical domain after the optical signals have been downconverted. There is often more flexibility in the digital domain and FSO spatially diverse receivers have been demonstrated for both coherent and noncoherent detection methods. One downside of digital combining is that the number of independent receivers scales with the number of receiver apertures, which may or may not increase cost and complexity.

Wavelength Diversity

Like other diversity techniques, multiple wavelengths can transmit identical or similar information and traverse a unique or shared path. If the path length is long enough, then a shared path through the atmosphere can introduce decorrelation between optical wavelengths. This effect has been studied via two-frequency mutual coherence functions. Interestingly, only for very long links, such as LEO-to-ground, and high optical turbulence, can two frequencies transmitted and received through the same aperture become significantly decorrelated. For this reason, many previous wavelength diversity systems use optical wavelengths very far apart, such as 800 nm and 1550 nm to ensure decorrelation. Demonstrations of wavelength diversity have been shown for both direct detection and coherent detection-based systems where the wavelengths are separated by wavelength-selective devices, processed by separate receivers, and optimally combined. Some implementations rely on coding across multiple wavelengths of a wavelength-division multiplexed channel.

BRIEF DESCRIPTION OF THE DRAWINGS

Reference will now be made to the accompanying drawings, which are not necessarily drawn to scale, and wherein.

DETAILED DESCRIPTION

Figure 1:
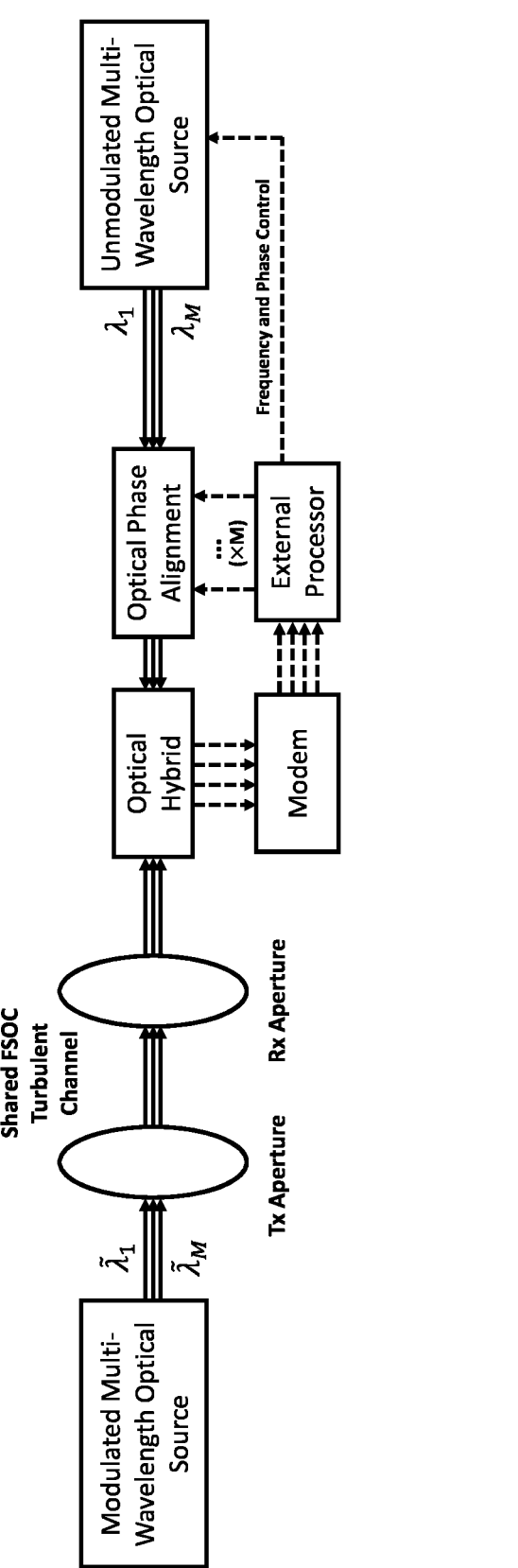
FIG. 1 is a block diagram illustrating in accordance with various aspects described herein an exemplary, non-limiting embodiment of a single-modem wavelength diversity system using a coherent multi-wavelength optical source at the transmitter and receiver. This system can utilize optical phase alignment and feedback from the modem.

The subject disclosure describes, among other things, illustrative embodiments for wavelength diversity mitigation. Other embodiments are described in the subject disclosure.

One or more aspects of the subject disclosure include a method for receiving a plurality of modulated optical wavelengths, wherein the plurality of modulated optical wavelengths are generated by a transmitter modem from digital input data and transmitter-side unmodulated optical wavelengths, wherein after the transmitter modem one or more of the plurality of modulated optical wavelengths undergo an optical operation, and wherein the plurality of modulated optical wavelengths are transmitted across a turbulent channel; converting of the plurality of modulated optical wavelengths into one or more electrical signals, wherein the optical operation ensures a signal to noise ratio (SNR) of the one or more electrical signals exceeds an SNR threshold; and processing the one or more electrical signals in a receiver modem to produce digital output data.

One or more aspects of the subject disclosure include a device having a processing system including a processor, and a memory that stores executable instructions that, when executed by the processing system, facilitate performance of operations. The operations can include receiving a plurality of modulated optical wavelengths, wherein the plurality of modulated optical wavelengths are generated from digital input data and unmodulated optical wavelengths, wherein one or more of the plurality of modulated optical wavelengths undergo an optical operation, and wherein the plurality of modulated optical wavelengths are transmitted across a turbulent channel; converting of the plurality of modulated optical wavelengths into one or more electrical signals, wherein the optical operation results in a signal to noise ratio (SNR) of the one or more electrical signals exceeding an SNR threshold; and processing the one or more electrical signals to produce digital output data.

One or more aspects of the subject disclosure include a non-transitory machine-readable medium, comprising executable instructions that, when executed by a processing performance of operations. The operations can include receiving a plurality of modulated optical wavelengths, wherein the plurality of modulated optical wavelengths are generated from digital input data and unmodulated optical wavelengths, and wherein one or more of the plurality of modulated optical wavelengths undergo an optical operation; converting of the plurality of modulated optical wavelengths into one or more electrical signals, wherein the optical operation increases a signal to noise ratio (SNR) of the one or more electrical signals to exceed an SNR threshold; and processing the one or more electrical signals to produce digital output data.

Due to atmospheric fading, free-space optical communications links can experience power drops for long periods on the scale of communications systems (100 microseconds to 10 milliseconds). A common approach to mitigation of fading relies on diversity-based techniques. Diversity-based techniques send common information across uncorrelated or partially-correlated information channels, which is combined at the receiver to reduce the overall outage probability. The innovation here is a method of diversity-based turbulence mitigation where the diverse information channels are individually distorted before or after free-space transmission. After diversity combining at the receiver, digital signal processing methods are used to compensate for the applied distortions and combine the diverse information channels in real-time. This method can significantly reduce equipment cost for diversity-based FSO communications systems and improve latency.

In wavelength-diversity free-space optical communications systems, similar or identical information is transmitted across a shared turbulent channel on unique wavelengths. The intensity and phase of the wavelengths at the receiver are uncorrelated or partially correlated after transmission. If information on both wavelengths are decoded, separately or jointly, the likelihood of successful transmission improves. A compact way to accomplish this type of system is shown in FIG. 1, where a multi-wavelength coherent optical source is jointly modulated and sent across a turbulent channel before being input to a coherent optical hybrid at the receiver. Another coherent multi-wavelength optical source is used as a local oscillator. It is required that each optical wavelength is phase aligned so that when the transmitted optical signal is combined in the coherent hybrid, the signals constructively interfere after downconversion in photodetectors after the hybrid. This can be implemented using an external controller and phase alignment stage as shown in FIG. 1.

Figure 2A:
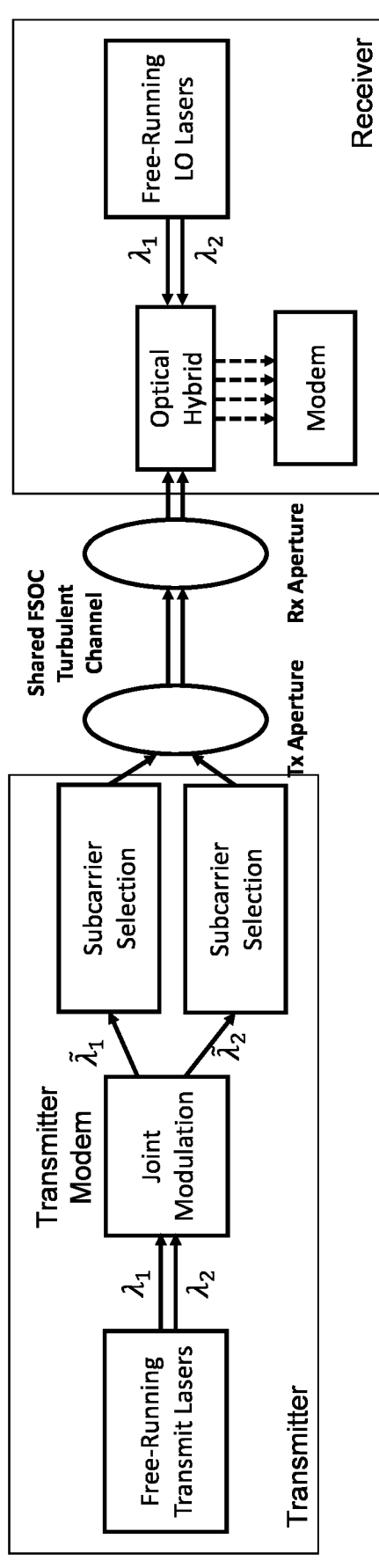
FIG. 2A is a block diagram illustrating in accordance with various aspects described herein an exemplary, non-limiting embodiment of a Single-modem wavelength-diversity system using incoherent multi-wavelength optical source for transmit and local oscillator lasers. The optical source shown here can be composed of free-running lasers.

An alternative method of implementing a single-modem wavelength-diversity system, the subject of this disclosure, is shown in FIG. 2A. In FIG. 1, it was desired that the multi-wavelength source would be composed of coherent carriers to alleviate optical phase alignment complexity in the receiver, while the system of FIG. 2A uses incoherent wavelengths and does not require an external processor or phase alignment stage. Here, after the wavelengths are jointly modulated, one (or more in a system with >2 wavelengths) of the wavelengths undergoes an optical operation, as defined in the subsection below titled "Wavelength-Dependent Optical Operation". The modulated wavelengths are then transmitted to a receiver through a turbulent channel and downconverted to electrical signals in photodetectors after an optical hybrid where the local oscillator is an incoherent multi-wavelength source. As shown in later sections, the introduction of a wavelength-dependent operation introduces a fixed impairment in the effective channel response of the system. A high-performance optical modem can track this impairment and compensate for its effects. Details will be discussed in later sections.

Free-Space Optical Channel

Generally, an optical wavelength that is passed through a turbulent channel experiences fluctuations in both intensity and phase. Multiple wavelengths, if they are spaced far enough away from each other in wavelength, can be received with uncorrelated or partially correlated intensity and phase even though they co-propagate across the same channel. In the following, we assume a system of 2 optical wavelengths co-propagating across a shared channel, although the analysis can be scaled to more wavelengths. Assuming a baseband transmit field for wavelength 1 and 2 equal to $A_1$ (t), after normalization of the power and phase shift, the received fields can be simply written as: $A_{1,rx}(t) = \alpha A_1(t)$, $A_{2,rx}(t) = \sqrt{1-\alpha^2}e^{i\theta}A_1(t)$ where $\alpha$ as is the field gain received by wavelength 1, $\sqrt{1-\alpha^2}$ is the field gain received by wavelength 2, and $\theta$ is the differential phase between wavelength 1 and wavelength 2. Atmospheric turbulence will cause a to vary between 0 and 1, while $\theta$ can vary across 0 to $2\pi$.

Wavelength-Dependent Optical Operation

The wavelength-dependent optical operation can take the form of linear or nonlinear impairments, and can be an optical delay, a polarization rotation, a nonlinear multiplication, an amplitude or phase modulation, an optical filter, or any other linear process. In the following, an optical delay will be analyzed.

Optical Delay

The introduction of an optical delay, $\Delta t$, on wavelength 2 causes a change in the effective channel. The received signal in the optical hybrid, ignoring noise sources and common group delay, after the turbulent channel is then:

$$A_{rx}(t) = \alpha A_1(t) + \sqrt{1 - \alpha^2}\, e^{i\theta} A_1(t - \Delta t)$$

Thus, the frequency domain signal transfer function is:

$$F(\omega) = \alpha + \sqrt{1 - \alpha^2}\, e^{i\theta} e^{-i\omega \Delta t}$$

Figure 2B:
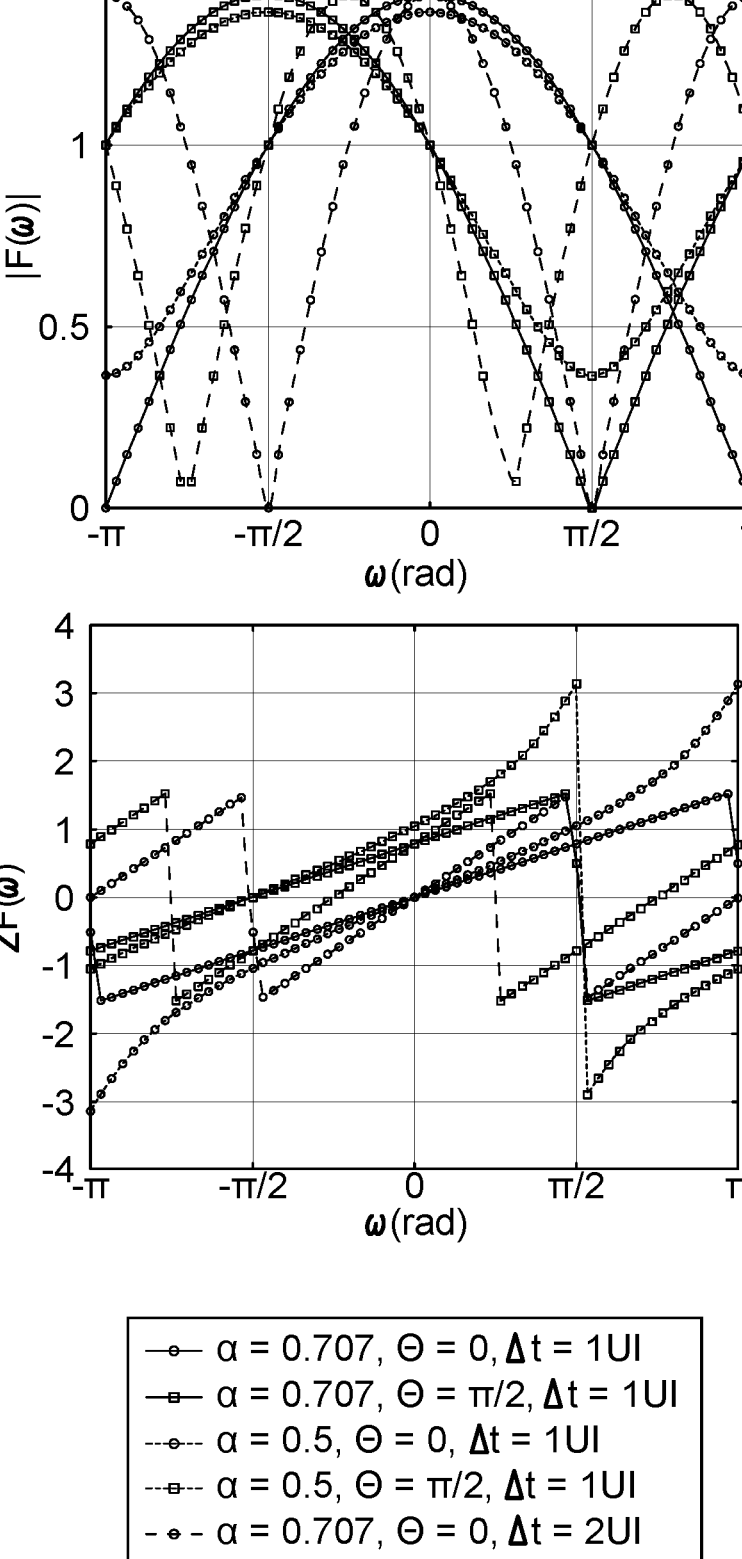
FIG. 2B is a block diagram illustrating in accordance with various aspects described herein an exemplary, non-limiting embodiment of Optical Delay Channel Response for various values of $\alpha$, $\theta$, and $\Delta t$. Importantly, there are significant dips in the channel response when the 2 wavelengths destructively interfere in the coherent receiver.

This channel response is shown for various values of $\alpha$, $\theta$, and $\Delta t$ in FIG. 2B. Note, $\Delta t$ is shown in units of "unit intervals" where $1 UI = 1/F_s$, where $F_s$ is the symbol rate.

DSP Channel Equalization Techniques

Commercial coherent modems are designed to equalize a variety of fiber channels. There are various techniques for equalizing these channels, using adaptive or fixed equalizers in the frequency domain or time domain with FIR filters, IIR filters, in the analog or digital domain. In the following, a dual polarization adaptive equalizer using a Least Mean Squares (LMS) algorithm is assumed. We assume that the received optical signal is amplified at the receiver and is dominated by amplified spontaneous emission (ASE) noise, reflected as independent noises added to the wavelengths as $n_1$ and $n_2$ such that the received waveform is:

$$A_{rx}(t) = \alpha A_1(t) + n_1 + \sqrt{1 - \alpha^2}\, e^{i\theta} A_1(t - \Delta t) + n_2$$

The theoretical LMS filter response in the frequency domain is $$LMS(\omega) = W(\omega) \frac{F^*(\omega)}{|F(\omega)|^2 + NSR_{ASE}}$$

Where $W(\omega)$ is a windowing function represented here as a brick wall filter corresponding to the channel bandwidth and $NSR_{ASE}$ is the noise-to-signal ratio of the combined integrated ASE from ASE sources $n_1$ and $n_2$.

Figure 2C:
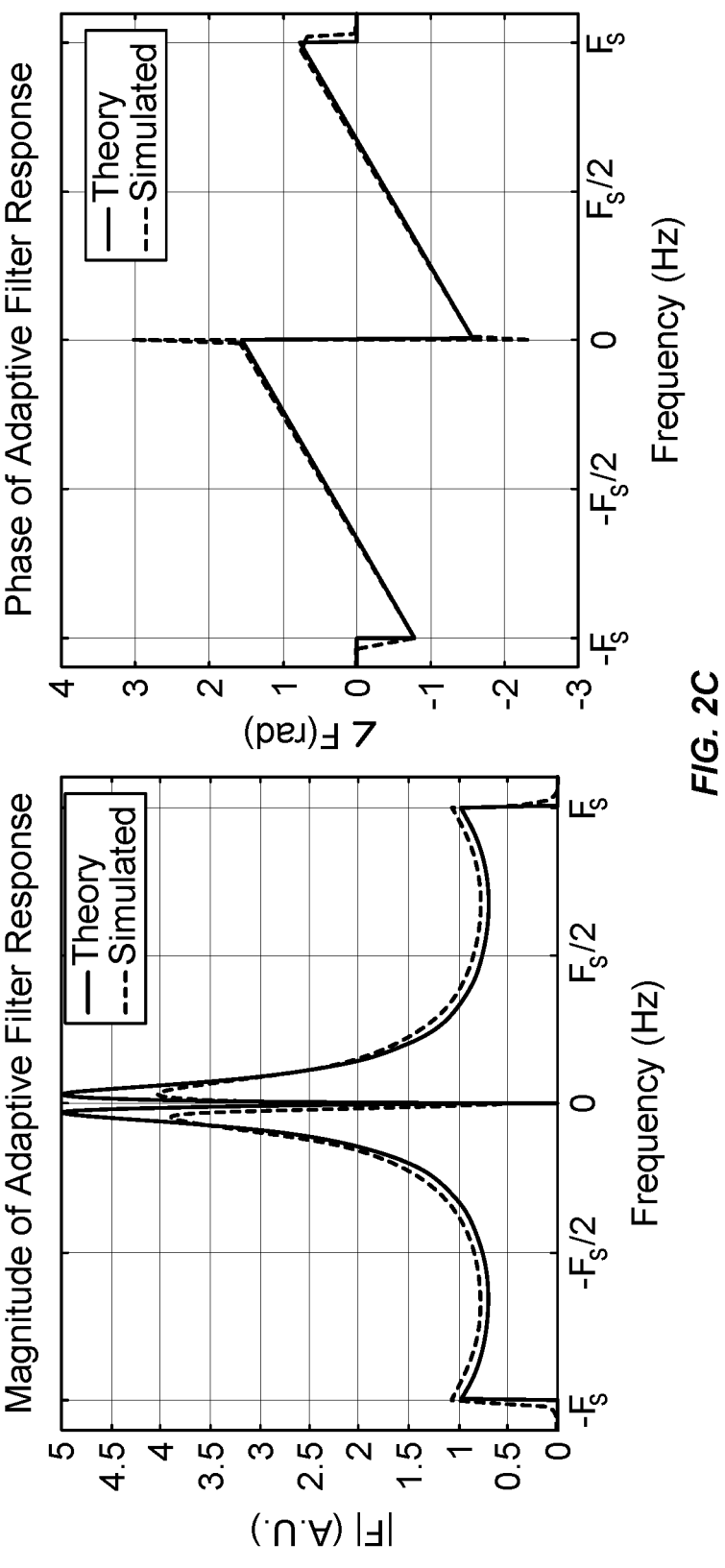
FIG. 2C is a block diagram illustrating in accordance with various aspects described herein an exemplary, non-limiting embodiment of a comparison between magnitude and phase of theoretical adaptive filter response and simulator learned adaptive filter response for $\alpha=1/\sqrt{2}$, $\theta=-\pi$, and $\Delta t=1.5UI$.

Using a modem simulator, it is possible to demonstrate agreement between the adaptive filter response and the theoretical response, as shown in FIG. 2C. In FIG. 2C, the filter response is calculated for $\alpha = 1/\sqrt{2}$, $\theta = -\pi$, and $\Delta t = 1.5 UI$.

Full-Spectrum Modem Performance

Figure 2D:
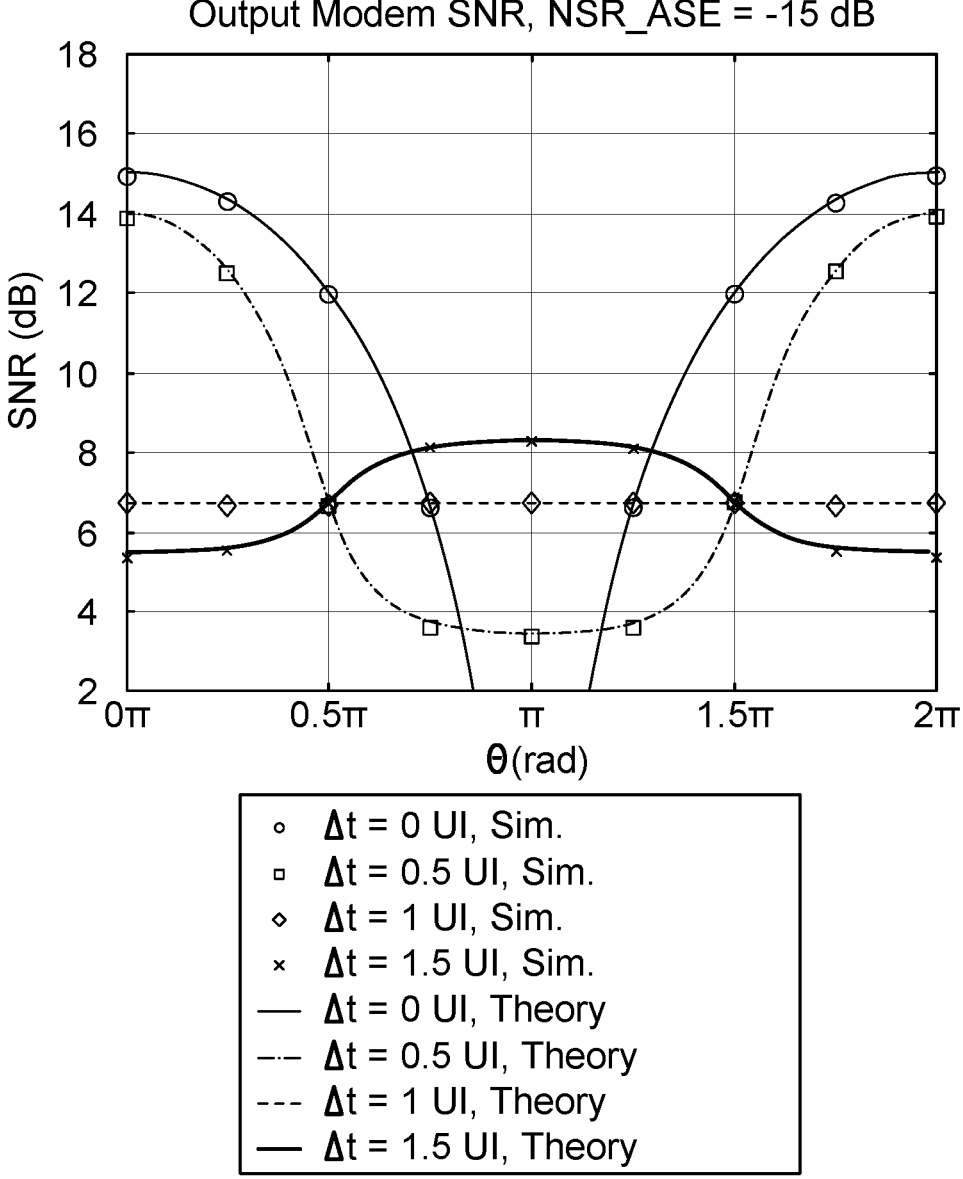
FIG. 2D is a block diagram illustrating in accordance with various aspects described herein an exemplary, non-limiting embodiment of a comparison of output modem SNR based on theory and simulation for $\alpha=1/\sqrt{2}$ and NSR_ASE=−15 dB.

Without additional logic or circuitry, and non-redundant data transmitted across the entire modem bandwidth, it is possible for the LMS adaptive filter to recover the optimal channel response. Due to the large dips in the channel response, the performance of the communication system will be degraded. In this case, there are two contributions to the overall noise of the channel in addition to ASE, the noise enhancement from the LMS filter and inter-symbol interference (ISI) from adjacent symbols. The total NSR can be written as:

$$NSR = \frac{1}{|g_{rx}(0)|^2} \sum_{k \neq 0} |g_{rx}(kT)|^2 + \frac{NSR_{ASE}}{|g_{rx}(0)|^2} \int_{-\infty}^{\infty} \frac{d\omega}{2\pi} W(\omega) |LMS(\omega)|^2$$

Where the first term is the ISI contribution and the second term is the LMS noise enhancement. Using a modem simulator, it can be shown that the NSR, or the signal-tonoise ratio (SNR), in both cases agree well. FIG. 2D shows a comparison between the theoretical SNR (1/NSR) and the modem simulator output SNR, showing excellent agreement. When the delay is an integer unit interval, the SNR is constant, resulting in consistent modem performance over fluctuations in $\theta$.

Figure 2E:
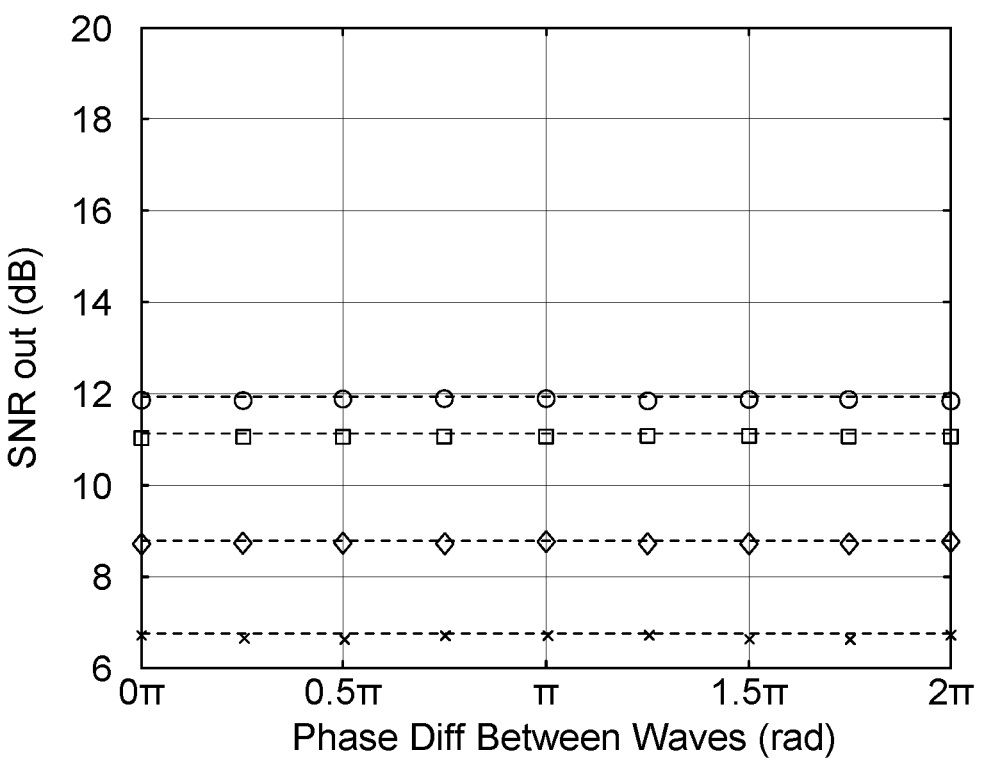
FIG. 2E is a block diagram illustrating in accordance with various aspects described herein an exemplary, non-limiting embodiment of a modem SNR from Simulation and Theory for various differential power splitting between wavelengths, where $\Delta t=1UI$ and NSR_ASE=−15 dB.

The modem performance can also be analyzed as the relative field gain a is varied. FIG. 2E shows the difference in modem SNR from theory and simulation for various power splitting values between wavelengths. As expected, the worst case SNR performance occurs when the wavelengths have equal power, which introduces sharp dips in the adaptive filter response.

Redundant Subcarrier Multiplexing Performance

In the full-spectrum method, the modem experiences an SNR penalty associated with the channel response. It is also possible to reduce the spectral efficiency of the link by transmitting redundant information on different subcarriers of the modem. Although the free-space channel parameters $\alpha$ and $\theta$ are unknown and random, they are correlated over periods related to the channel correlation time, which is typically on the order of milliseconds and thus capable of being tracked by a modem. By sending redundant information on multiple subcarriers and selectively combining the information in these channels, it is possible to gain the benefits of diversity with minimal SNR penalty.

Figure 2F:
FIG. 2F is a block diagram illustrating in accordance with various aspects described herein an exemplary, non-limiting embodiment of a per-subcarrier modem SNR via simulation for a signal composed of 8 independent subcarriers for $\Delta t=1UI$, and NSR_ASE=−15 dB. Subcarriers that do not experience dips in the channel response can achieve the maximum SNR.
Figure 2F:
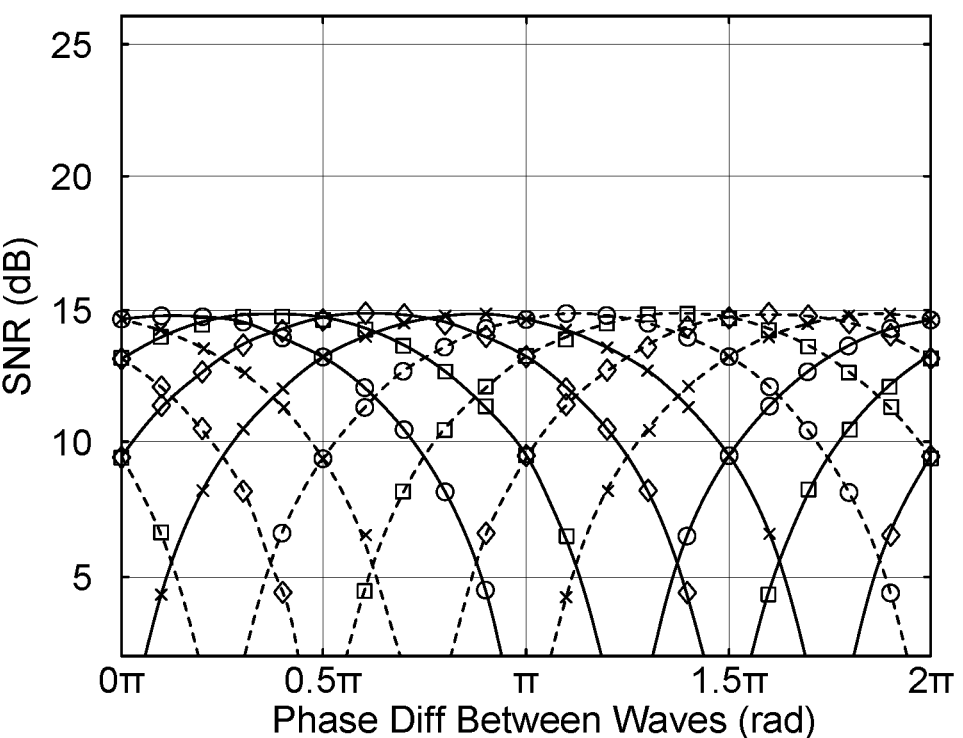

FIG. 2F shows the per-subcarrier performance for a subcarrier-multiplexed system where the signal is composed of 8 independent subcarriers. While the SNR of each of the subcarriers can achieve the optimal SNR of 15 dB for certain values of $\theta$, some of the carriers experience significantly reduced SNRs due to dips in the channel response.

Figure 2G:
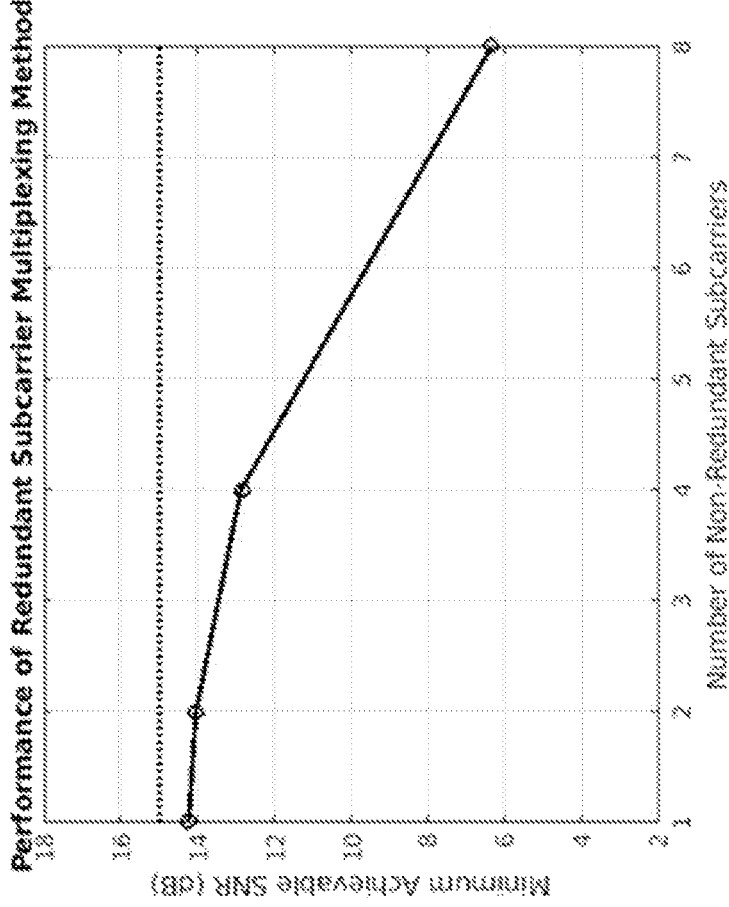
FIG. 2G is a block diagram illustrating in accordance with various aspects described herein an exemplary, non-limiting embodiment of an achievable SNR for the redundant subcarrier multiplexing method described in the text, for $\alpha=1/\sqrt{2}$, $\Delta t=1UI$, and where the number of total subcarriers is 8.

In order to reduce the SNR penalty from the dips in the channel response, redundant information can be sent on the subcarriers so that diversity gain can be achieved regardless of the received phase of the two wavelengths. An example is shown in FIG. 2G, where the achievable SNR is shown as a function of the number of non-redundant subcarriers. When each of the subcarriers transmits the same information (only 1 non-redundant subcarrier), it is possible to achieve close to the theoretical SNR of the channel. In subcarrier multiplexed systems with channels with large dips, the floor in the achievable SNR for a spectrum composed of non-redundant subcarriers approaches the achievable SNR of the full-spectrum approach as long as bit errors across all subcarriers are averaged, as shown by the minimum achievable SNR for 8 redundant subcarriers in FIG. 2G.

Extension to other Diversity Systems

While the aforementioned subject disclosure is tailored to wavelength diversity systems, it will be appreciated that the above embodiments can be combined with other types of diversity such as spatial diversity and temporal diversity for free-space optical links.

In at least some embodiments, a digital signal processing (DSP) solution is identified to address instability in a continuous operating state of a coherent communication system, e.g., modem, that may stem from inaccuracies in a transceiver's estimate of transmission line properties produced by narrow, in-band phase and/or amplitude features related to gas absorption line notches. In present day modems, phase, amplitude, polarization and timing of transmitted data are recovered in part by a pair of filter types, e.g., as described in U.S. Pat. No. 8,385,747, incorporated herein by reference in its entirety. One of the filters exhibits a slower response, e.g., being designed to act in a manner independent of incoming polarization, sometimes referred to as common mode. Another filter may be faster, e.g., acting on a polarization dependent channel response. In continuous operation, the faster filter may also routinely accommodate common mode changes stemming from time evolution of the channel. To preserve an available dynamic range of the fast filter, an estimate of its common mode content may be used to periodically update the slow filter. Components of that estimate include residual second and third-order chromatic dispersion (CD) as well as relative delays of transmission sub-spectra. It has been observed through measurement of transmission performance that these estimates may be compromised in the presence of narrow molecular absorptions from gaseous contaminants, such as trace amounts of CO and/or $CO_2$ gas as may be found in hollow core fiber. It is understood that other transport media, including free-space optical transmissions, can also experience absorption lines due to a gas and/or other contaminant.

Various elements and effects in an optical link between two communicating devices may result in the degradation of transmitted signals. That is, optical signals received over optical links can become distorted. Particularly, these signals may suffer from polarization mode dispersion (PMD), polarization dependent loss or gain (PDL or PDG), state of polarization (SOP) rotation, amplified spontaneous emission (ASE) noise, wavelength-dependent dispersion or chromatic dispersion (CD), nonlinear noise from propagation through fiber, and/or other effects. For instance, polarization effects of a fiber link tend to rotate the transmitted polarizations such that, at the receiver, they are neither orthogonal to each other nor aligned with the polarization beam splitter of the optical hybrid. As a result, each of the received polarizations (e.g., downstream of the polarization beam splitter) may contain energy from both of the transmitted polarizations, as well as distortions due to CD, PMD, PDL, etc. These problems may be compounded for polarization-division multiplexed signals in which each transmitted polarization contains a respective data signal. The degree of signal degradation due to noise and nonlinearity may be characterized by a signal-to-noise ratio (SNR) or, alternatively, by a noise-to-signal ratio (NSR). The signals transmitted in the communications network may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

Figure 2H:
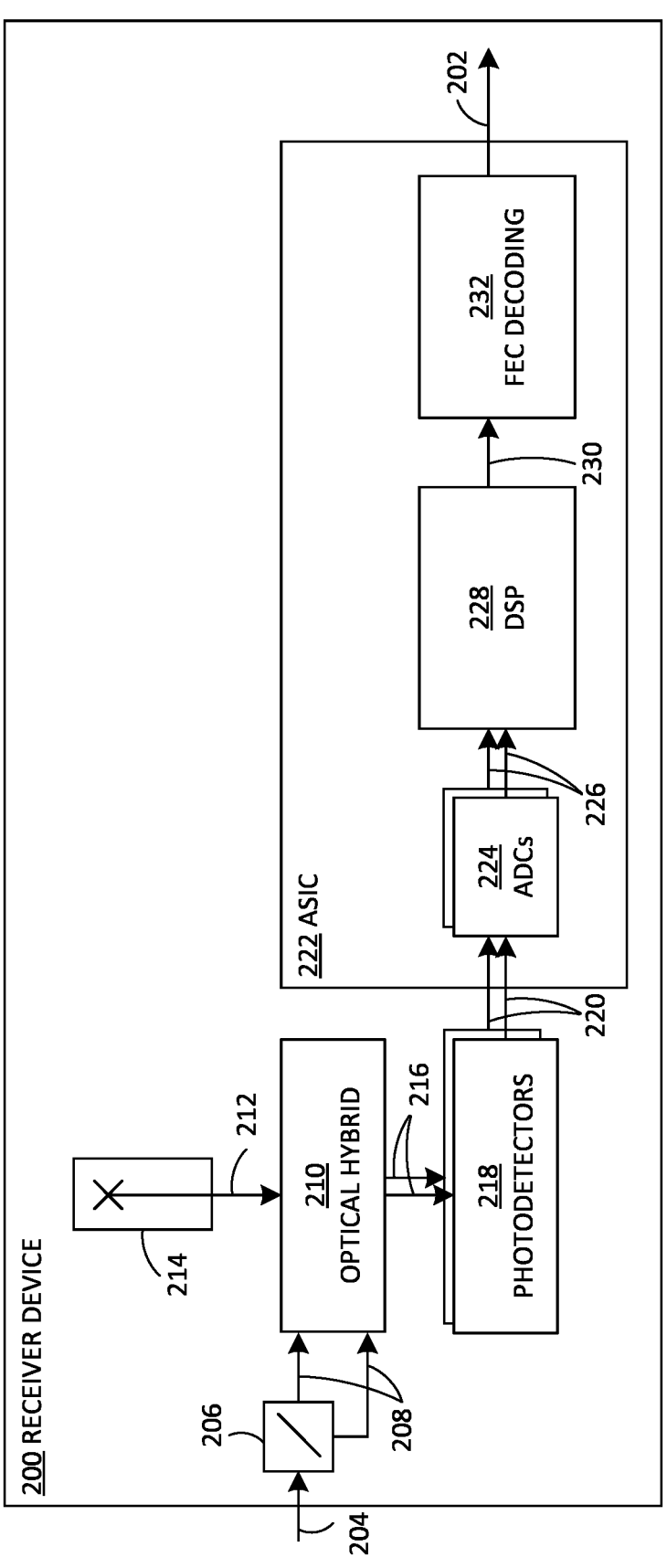
FIG. 2H is a block diagram illustrating in accordance with various aspects described herein an exemplary, non-limiting embodiment of a receiver device that may be adapted according to the embodiments of the subject disclosure.

FIG. 2H illustrates an example receiver device 200 in accordance with various aspects described herein. In various embodiments, the receiver device 200 may be the same as or similar to (or otherwise correspond to or adapted to use in whole or in part the embodiments of) the receiver of FIG. 2A and may be configured to receive an optical signal 204, which may comprise a degraded version of an optical signal generated by a transmitter device (e.g., the transmitter device of FIG. 2A). The optical signal generated by the transmitter device may be representative of information bits (also referred to as client bits) which are to be communicated to the receiver device 200. The optical signal generated by the transmitter device may be representative of a stream of symbols. According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques, such as frequency division multiplexing (FDM), polarization-division multiplexing (PDM), single polarization modulation, modulation of an unpolarized carrier, mode-division multiplexing, spatial-division multiplexing, Stokes-space modulation, polarization balanced modulation, wavelength division multiplexing (WDM) (where a plurality of data streams is transmitted in parallel, over a respective plurality of carriers, where each carrier is generated by a different laser, e.g., a transmitter or Tx laser), and/or the like. For example, the receiver device 200 can facilitate in whole or in part an identifying of a narrow-band absorption occurring within a signal spectrum of the optical signal 204 when propagating through a gaseous medium, associating the narrow-band absorption with a vulnerability, and controlling a digital circuit, e.g., the ASIC 222 to mitigate at least a portion of the vulnerability.

The receiver device 200 may be configured to recover corrected client bits 202 from the received optical signal 204. The receiver device 200 may include a polarizing beam splitter 206 configured to split the received optical signal 204 into polarized components 208. According to one example implementation, the polarized components 208 may include orthogonally polarized components corresponding to an X-polarization and a Y-polarization. An optical hybrid 210 may be configured to process the components 208 with respect to an optical signal 212 produced by a laser 214, e.g., a receiver or Rx laser, thereby resulting in optical signals 216. Photodetectors 218 may be configured to convert the optical signals 216 output by the optical hybrid 210 to analog electrical signals 220. A frequency difference between an operating wavelength or frequency of the Tx laser and an operating wavelength or frequency of the Rx laser may be referred to as an Intermediate Frequency, and an offset of that away from nominal can be called $f_{IF}$. (The nominal difference is usually zero.) According to one example implementation, the photodetectors 218 generate analog signals 220 responsive to the optical signals 216 received from the optical hybrid 210, which may include four signals corresponding, respectively, to dimensions XI, XQ, YI, and YQ, where XI and XQ denote in-phase and quadrature-phase components of an X-polarization, while YI and YQ denote in-phase and quadrature-phase components of a Y-polarization. Together, elements such as the beam splitter 206, the laser 214, the optical hybrid 210, and the photodetectors 218 may form a communication interface configured to receive optical signals from other devices in a communication network.

As shown in FIG. 2H, the receiver device 200 may include a receiver processing device configured for a special application, such as an application specific integrated circuit (ASIC) 222. The receiver 200 may include one or more analog-to-digital converters (ADCs) 224 that are configured to sample the analog signals 220 and generate respective digital signals 226. In at least some embodiments, the ADCs 224 may be included within the ASIC 222. In certain alternate embodiments, the ADCs 224 or portions thereof may be separate from the ASIC 222. The ADCs 224 may sample the analog signals 220 periodically at a sample rate that is based on a signal received from a voltage-controlled oscillator (VCO) at the receiver device 200 (not shown).

The ASIC 222 may be configured to apply digital signal processing to the digital signals 226, e.g., using a digital signal processing (DSP) system 228. The digital signal processing (DSP) system 228 may be configured to perform processing that is designed to compensate for a variety of channel impairments, sometimes referred to as equalization. Example channel impairments that may be compensated by the DSP system 228 include, without limitation, one or more of CD, SOP rotation, mean PMD that determines the probability distribution which instantiates as differential group delay (DGD), PDL or PDG, and/or other effects. In at least some embodiments, the digital signal processing system 228 may further be configured to perform carrier recovery processing, which may include calculating an estimate of carrier frequency offset $f_{IF}$ (i.e., the difference between the frequency of the transmitter laser and the frequency of the receiver laser 214). According to some example implementations, the DSP system 228 may further be configured to perform operations such as multiple-input-multiple-output (MIMO) filtering, clock recovery, and FDM subcarrier demultiplexing. The DSP system 228 may also be configured to perform symbol-to-bit demapping (or decoding) using a decision circuit, such that processed signals 230 output by the DSP system 228 are representative of bit estimates. Where the received optical signal 204 is representative of symbols comprising FEC-encoded bits generated as a result of applying FEC encoding to client bits, the signals 230 may further undergo FEC decoding 232 to recover the corrected client bits 202.

According to some example implementations, the equalization processing implemented as part of the DSP system 228 may include one or more equalizers, some or all of which may be configured to compensate for impairments in the channel response. In general, an equalizer applies a substantially linear filter to an input signal to generate an output signal that is less degraded than the input signal. The filter may be characterized by compensation coefficients which may be incrementally updated from time to time (e.g., every so many clock cycles or every so many seconds) with the goal of reducing the degradation observed in the output signal.

According to some example implementations, the equalization processing of the DSP system 228 may include an equalizer filter (referred to herein as a "C filter") that is designed to apply a dispersive function to at least partially compensate for slowly changing channel impairments, such as CD. The C filter may be configured as a quasi-static dispersion-compensating filter and/or a spectral-shaping filter (i.e., that provides basic matched filter shaping). As an example, compensation coefficients for the C filter may be calculated through firmware using the estimated CD during start-up of the receiver device (also referred to as the acquisition stage), and those coefficients may be applied to received signals (e.g., by convolution in the time domain or by multiplication in the frequency domain), thereby resulting in processed signals which are, at least partially, compensated for CD. The C filter may be referred to as static or quasi-static because the updating of its compensation coefficients is relatively infrequent. For instance, the coefficients may be updated periodically (e.g., once every second) based on information obtained downstream during the digital signal processing. The slow rate of change of the compensation coefficients means that the static (or quasi-static) equalizer filter may only be capable of tracking and compensating for relatively slow changes in the channel response, and not fast changes. For example, the static (or quasi-static) equalizer filter may be able to compensate for changes in CD, which are typically at a rate on the order of about 1 Hz or slower, but the static (or quasi-static) equalizer filter may be unable to compensate for changes in SOP rotation, which typically happen much more quickly.

According to some example implementations, the equalization processing of the DSP system 228 may include an additional equalizer filter (referred to herein as an "H filter") which uses feedback to compensate for relatively fast changes in the channel response, such as SOP changes, PMD changes, PDL changes, small amounts of CD, and/or analog characteristics of the transmitter and receiver, which may change at a rate substantially greater than about 1 Hz, e.g., on the order of kHz. For example, the feedback-equalizer H filter may compensate for impairments varying at a rate of approximately 100 kHz. In various embodiments, feedback equalization of the H filter may rely on a least-mean-squares (LMS) feedback loop and/or adaptive Wiener filtering, e.g., using one or more of a constant modulus algorithm (CMA), an affine projection algorithm (APA), or a recursive least-squares (RLS) algorithm. For instance, feedback equalization may leverage frequency-domain RLS equalization. In various embodiments, feedback equalization may additionally, or alternatively, be implemented using blocks in the time domain.

In one or more embodiments, the tracking response of the H filter may be more than ten times faster than that of the C filter. For instance, one or more aspects of the optical coherent receiver described in U.S. Pat. No. 7,555,227 (which issued on Jun. 30, 2009, and is incorporated herein by reference in its entirety), may be employed in one or more systems/receivers described herein. For instance, one or more aspects of the equalization described in U.S. Pat. No. 7,555,227, which is separated into a C filter and an H filter, may be utilized in the receiver 200 of FIG. 2H herein.

It will be further appreciated that the embodiments described in U.S. patent application Ser. No. 18/483,906, filed on Oct. 10, 2023, entitled, "Method and Apparatus for Spatial Diversity Schemes in Free-Space Optical Communications," may be combined in whole or in part with the embodiments of the subject disclosure. Additionally, it will be appreciated that the embodiments described in U.S. Prov. Pat. Application No. 63/503,765, filed on May 23, 2023, entitled, "Method and Apparatus for Spatial Diversity Schemes in Free-Space Optical Communications," may also be combined in whole or in part with the embodiments of the subject disclosure. U.S. patent application Ser. No. 18/483, 906 and U.S. Prov. Pat. Application No. 63/503,765 are each hereby incorporated by reference in their entirety.

Various elements and effects in an optical link between two communicating devices may result in the degradation of transmitted signals. That is, optical signals received over optical links can become distorted. Particularly, these signals may suffer from polarization mode dispersion (PMD), polarization dependent loss or gain (PDL or PDG), state of polarization (SOP) rotation, amplified spontaneous emission (ASE) noise, wavelength-dependent dispersion or chromatic dispersion (CD), nonlinear noise from propagation through fiber, and/or other effects. For instance, polarization effects of a fiber link tend to rotate the transmitted polarizations such that, at the receiver, they are neither orthogonal to each other nor aligned with the polarization beam splitter of the optical hybrid. As a result, each of the received polarizations (e.g., downstream of the polarization beam splitter) may contain energy from both of the transmitted polarizations, as well as distortions due to CD, PMD, PDL, etc. These problems may be compounded for polarization-division multiplexed signals in which each transmitted polarization contains a respective data signal. The degree of signal degradation due to noise and nonlinearity may be characterized by a signal-to-noise ratio (SNR) or, alternatively, by a noise-to-signal ratio (NSR). The signals transmitted in the communications network may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

Figure 3:
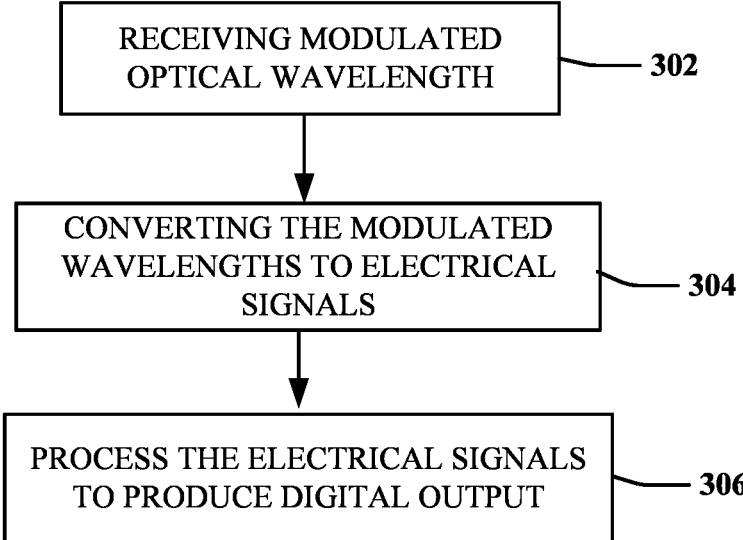
FIG. 3 depicts an illustrative embodiment of a method in accordance with various aspects described herein.

FIG. 3 depicts an illustrative embodiment of a method 300 in accordance with various aspects described herein. Method 300 can begin at step 302 with receiving a plurality of modulated optical wavelengths. In one embodiment the plurality of modulated optical wavelengths can be generated by a transmitter modem from digital input data and transmitter-side unmodulated optical wavelengths. After the transmitter modem, one or more of the plurality of modulated optical wavelengths can undergo an optical operation, which results in the plurality of modulated optical wavelengths being transmitted across a turbulent channel. At step 304, the plurality of modulated optical wavelengths can be converted into one or more electrical signals. The optical operation previously mentioned in step 302 ensures a signal to noise ratio (SNR) of the one or more electrical signals exceeds an SNR threshold that can be set to a desired value. At step 306, the one or more electrical signals can be processed in a receiver modem to produce digital output data.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
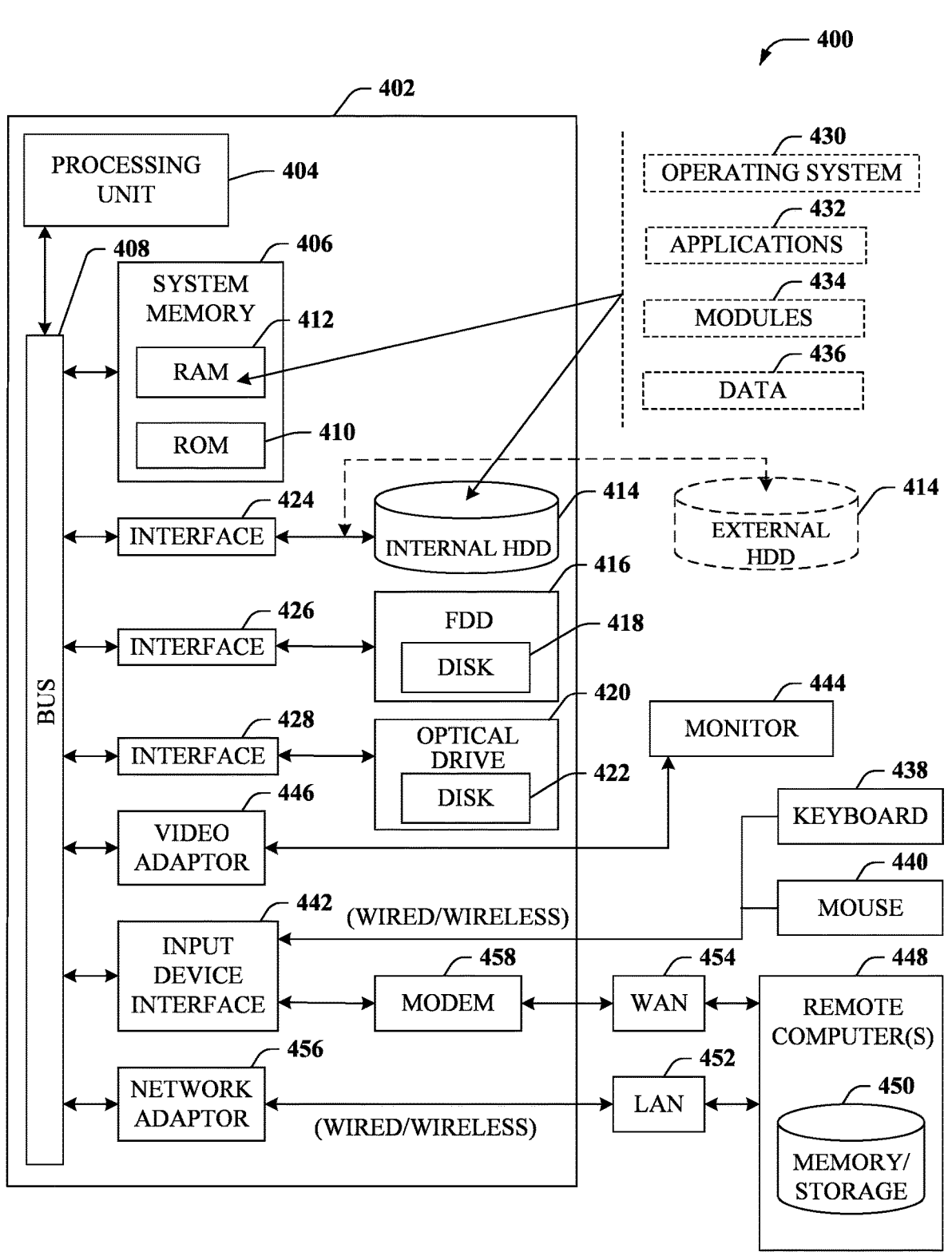
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, computing environment 400 can facilitate in whole or in part the embodiments described above in relation to FIGS. 2A and 2H and other associated figures.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD

414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device configured for a wavelength-diverse optical communications link, comprising:

circuitry configured to perform operations, the operations comprising receiving a plurality of modulated optical wavelengths, wherein the plurality of modulated optical wavelengths are generated by a transmitter modem from digital input data and transmitter-side unmodulated optical wavelengths, wherein generating of the plurality of modulated optical wavelengths involves subcarrier multiplexing, and wherein, after the transmitter modem, one or more of the plurality of modulated optical wavelengths undergo at least one optical operation that involves subcarrier selection prior to being transmitted across a turbulent channel, converting of the plurality of modulated optical wavelengths into one or more electrical signals, wherein the at least one optical operation ensures a signal to noise ratio (SNR) of the one or more electrical signals exceeds an SNR threshold, and processing the one or more electrical signals in a receiver modem to produce digital output data.

2. The device of claim 1, wherein the at least one optical operation comprises an optical delay, a polarization rotation, a nonlinear multiplication, an amplitude or phase modulation, an optical filter, or another linear or nonlinear process.

3. The device of claim 2, wherein the optical delay is an integer unit interval of time defined by an inverse of a symbol rate.

4. The device of claim 1, wherein the transmitter modem and the receiver modem are configured for a single wavelength.

5. The device of claim 1, wherein the transmitter-side unmodulated optical wavelengths are generated by one or more optical sources where a phase difference between the transmitter-side unmodulated optical wavelengths is unknown or varying.

6. The device of claim 1, wherein the turbulent channel introduces partially correlated or uncorrelated phases and amplitudes of the plurality of modulated optical wavelengths.

7. The device of claim 1, wherein the converting is performed with a coherent optical hybrid and photodetectors, and wherein a local oscillator is mixed with the plurality of modulated optical wavelengths.

8. The device of claim 7, wherein the local oscillator is composed of one or more receiver-side unmodulated wavelengths where phases of the receiver-side unmodulated wavelengths or the plurality of modulated optical wavelengths or both are unknown or time-varying.

9. The device of claim 1, wherein the wavelength-diverse optical communications link is characterized by a channel response, and wherein the at least one optical operation changes the channel response.

10. The device of claim 9, wherein the processing utilizes an adaptive equalizer of the receiver modem that compensates for the channel response, and wherein the adaptive equalizer is configured to utilize a least mean squares algorithm, a recursive least squares algorithm, a stochastic gradient descent algorithm, a constant modulus algorithm, or any combination thereof.

11. The device of claim 9, wherein the plurality of modulated optical wavelengths and the one or more electrical signals include one or more subcarriers.

12. The device of claim 11, wherein the one or more subcarriers are subjected to intersymbol interference, power loss, or noise enhancement based on the channel response.

13. The device of claim 11, wherein the one or more of the subcarriers comprises at least two subcarriers that are similar or identical to each other.

14. The device of claim 13, wherein the at least two subcarriers are combined in the receiver modem based on maximal ratio combining (MRC), equal gain combining (EGC), selective combining (SC), or any combinations thereof.

15. The device of claim 11, wherein the one or more subcarriers or information derived from the one or more subcarriers is further processed according to MRC, EGC, SC, or combinations thereof.

16. The device of claim 1, wherein the wavelength-diverse optical communications link utilizes spatial or temporal diversity techniques.

17. A method for a wavelength-diverse optical communications link, comprising:

receiving a plurality of modulated optical wavelengths, wherein the plurality of modulated optical wavelengths are generated by a transmitter modem from digital input data and unmodulated optical wavelengths, wherein generating of the plurality of modulated optical wavelengths involves subcarrier multiplexing, and wherein, after the transmitter modem, one or more of the plurality of modulated optical wavelengths undergo at least one optical operation that involves subcarrier selection prior to being transmitted across a turbulent channel;

converting of the plurality of modulated optical wavelengths into one or more electrical signals, wherein the at least one optical operation results in a signal to noise ratio (SNR) of the one or more electrical signals exceeding an SNR threshold; and processing the one or more electrical signals to produce digital output data.

18. The method of claim 17, wherein the at least one optical operation comprises an optical delay, a polarization rotation, a nonlinear multiplication, an amplitude or phase modulation, an optical filter, or another linear or nonlinear process.

19. A system comprising:

first circuitry configured to generate a plurality of modulated optical wavelengths from digital input data and unmodulated optical wavelengths, wherein generating of the plurality of modulated optical wavelengths involves subcarrier multiplexing, and wherein one or more of the plurality of modulated optical wavelengths undergo at least one optical operation that involves subcarrier selection prior to being transmitted across a turbulent channel; and second circuitry configured to perform operations including receiving a plurality of optical signals from the turbulent channel that correspond the plurality of modulated optical wavelengths transmitted across the turbulent channel, converting of the plurality of modulated optical wavelengths into one or more electrical signals, wherein the at least one optical operation increases a signal to noise ratio (SNR) of the one or more electrical signals to exceed an SNR threshold, and processing the one or more electrical signals to produce digital output data.

20. The system of claim 19, wherein the at least one optical operation comprises an optical delay, a polarization rotation, a nonlinear multiplication, an amplitude or phase modulation, an optical filter, or another linear or nonlinear process.

* * * * *